April 21, 1964  W. C. EAVES  3,129,956
SPLASH GUARD
Filed Oct. 16, 1959  2 Sheets-Sheet 1
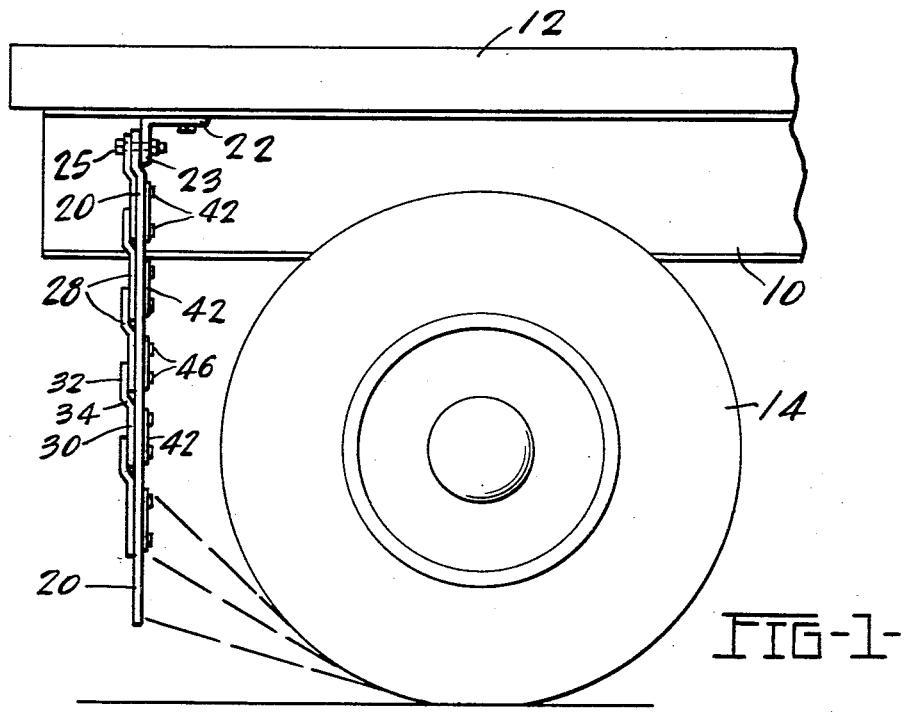
FIG-1-
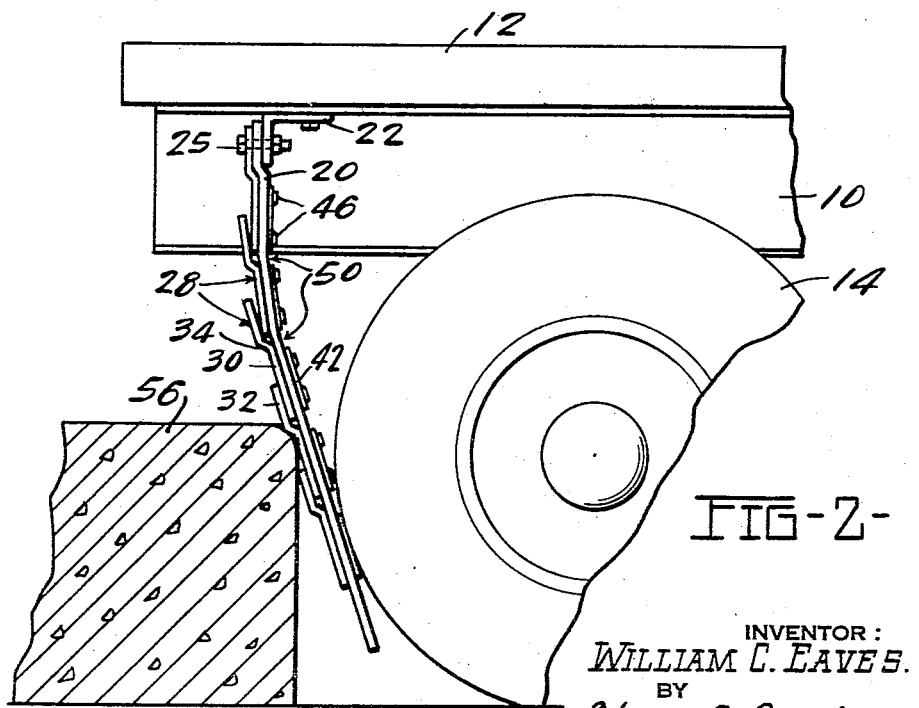
FIG-2-
INVENTOR:
WILLIAM C. EAVES.
BY
Harry O. Ernsberger
ATTORNEY April 21, 1964     W. C. EAVES     3,129,956
SPLASH GUARD
Filed Oct. 16, 1959     2 Sheets-Sheet 2
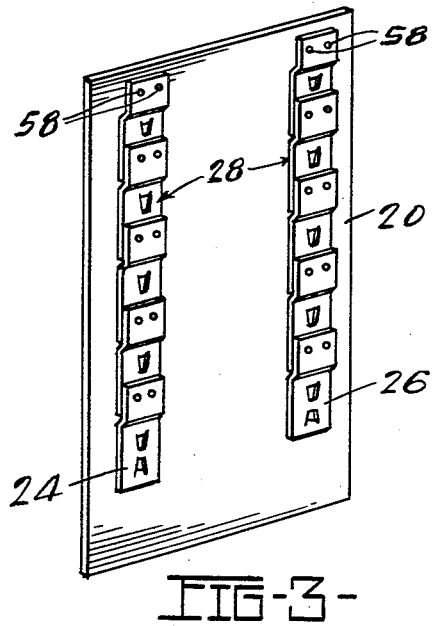
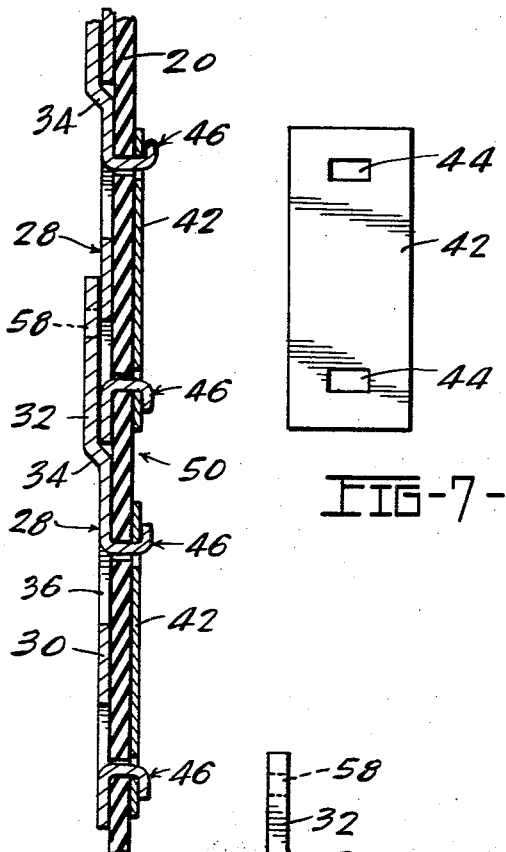
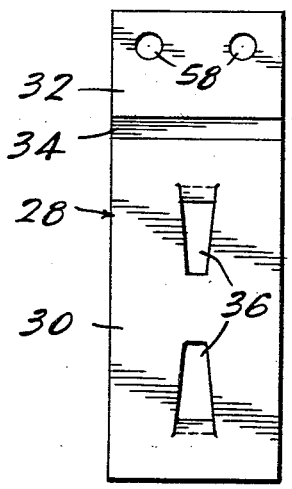
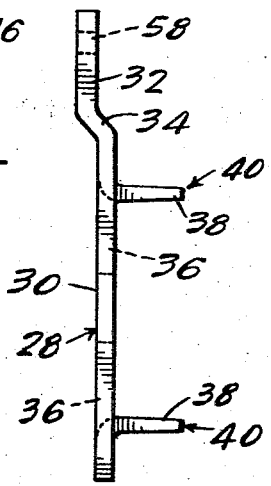
INVENTOR:
WILLIAM C. EAVES.
BY
Harry O. Ernsberger
ATTORNEY

United States Patent Office 3,129,956
Patented Apr. 21, 1964

3,129,956
SPLASH GUARD
William C. Eaves, 407 S. Dearborn St., Chicago 5, Ill.
Filed Oct. 16, 1959, Ser. No. 846,982
4 Claims. (Cl. 280—154.5)

This invention relates to splash guards for vehicles and more especially to splash guards for use with heavy duty vehicles such as trucks, trailers, tractor-trailer vehicles, and similar vehicles.

It has been conventional practice to use flat flaps or sheet-like guards at the rear of wheels of trucks and other heavy duty vehicles purportedly for the purpose of obstructing water, mud, stones, or other foreign matter that may be thrown rearwardly from the wheels of the vehicle. The flaps or splash guards of this character have been fashioned of flat sheets of comparatively thick flexible rubber which are secured to and depend from the vehicle frame at a slight distance rearwardly of the vehicle wheels. As such flaps are fashioned of flexible rubber and are suspended from their upper edge regions, they are adaptable for free swinging movements in both directions lengthwise of the vehicle. At high vehicle speeds the sheets or flaps tend to sail rearwardly of the vehicle approaching horizontal positions and therefore are substantially ineffective to obstruct or impede rearward traverse of foreign matter thrown from the tires of the vehicle.

Splash guards or flat flaps of this character have been extensively used because of their low cost and ease of installation but they fail to provide a practical and effective means for preventing rearward projection of foreign matter. Furthermore, the higher the vehicle speed, the greater the tendency for the flap to sail toward the rear, thus affording the least protection when it is most needed.

The present invention embraces the provision of a splash guard construction utilizing a sheet of flexible onmetallic material provided with a plurality of overlapping metal units or members arranged so that the flexible sheet is prevented, by adjacent overlapping portions of the units, from appreciable movement in a direction rearwardly of the vehicle but which permit flexure of the sheet in the opposite direction.

An object of the invention is the provision of a splash guard construction comprising a flat sheet of flexible material equipped with a plurality of individual units or members wherein each unit is secured to the sheet in over-lapping relation with adjacent units to restrict flexure of the sheet in a direction rearwardly of the vehicle.

Another object of the invention is the provision of a plurality of substantially identically shaped metal members having offset portions which are adapted to be secured in overlapping relation to a flat flap or sheet of flexible material whereby each member is secured to the sheet or flap and the members arranged to effectively resist flexure of the flexible member in one direction but permitting flexure in the opposite direction.

Another object of the invention is the provision of a reinforcing plate or member for a flexible sheet of material formed with means adapted to extend through the flexible sheet and distorted in a manner to secure the reinforcing member to the flexible sheet whereby a plurality of the members applied in overlapping aligned relation to the flexible sheet effectively resist flexure of the sheet in one direction.

Another object of the invention is the provision of reinforcing plates or members which may be applied to a flexible sheet of material, each being adapted to be applied and secured thereto without the use of special tools.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of the rear portion of a truck type vehicle illustrating a form of the invention associated therewith;

FIGURE 2 is a view similar to FIGURE 1 illustrating the position of a splash guard of the invention when a vehicle equipped with the splash guard is backed into an impediment;

FIGURE 3 is an isometric view of the splash guard construction of the invention;

FIGURE 4 is a plan view of one of the plates or members forming a component of the splash guard construction;

FIGURE 5 is a side elevational view of the structure shown in FIGURE 4;

FIGURE 6 is an enlarged detail sectional view illustrating the overlapping relation of the plate components of the construction and a form of means securing the components to the flexible sheet of material of the guard, and FIGURE 7 is a plan view of a backing member forming a component of the securing means.

While the form of the invention illustrated herein is adapted to be associated with or mounted adjacent the rear wheels of a truck type vehicle, it is to be understood that the splash guard arrangement may be utilized with other types of heavy duty vehicles having dual wheels or multiple sets of wheels or may be used with wheels of trailers or wherever the same may be found to have utility.

Referring to the drawings in detail, and initially to FIGURES 1 and 2, there is illustrated the rear portion of a frame 10 of a truck type vehicle which supports a bed or body construction 12 or other load carrying arrangement. Conventional springs are disposed between the frame and the axle (not shown) supporting the rear wheels 14 of the vehicle in the usual manner. The vehicle may be equipped with single wheels or dual wheels and the splash guard arrangement has utility with either type of construction.

The splash guard construction includes a planar sheet-like body or flap 20 preferably of rectangular configuration which is adapted to be supported by or suspended from a transversely extending bracket means 22 secured to the vehicle frame or body, one of the brackets being shown in FIGURES 1 and 2. The sheet-like flexible body or flat flap 20 is disposed a slight distance rearwardly of the rear wheel or wheels, the width of the splash guard being dependent upon whether the guard is used with a single wheel or with dual wheels. The flexible body 20 may be fashioned of molded rubber or other plastic or resin and of a thickness of upwards of one quarter of an inch or more. The molded sheet may be provided with a fabric base or core for added strength.

The present invention includes a reinforcing means provided for the flexible body or sheet to effectively prevent rearward movement or sailing of the sheet during forward travel of the vehicle but which will permit relative movement or flexure of the flexible body toward the adjacent vehicle wheel for purposes hereinafter explained. The reinforcing means for preventing relative rearward sailing of the guard is inclusive of one or more rows of metal plates or members which are of a shape and arranged in overlapped relation to resist deformation or flexure of the sheet in a direction rearwardly of the vehicle.

As shown in FIGURE 3, there are two rows designated 24 and 26 of the reinforcing units, each row comprising a plurality of members or plates 28 formed of metal.

With particular reference to FIGURES 4 and 5, each plate or member 28 is formed with a planar base or attachment portion 30 and an offset planar portion 32, the portions 30 and 32 preferably arranged in parallel planes and integrally joined as at 34. Each of the members or plates 28 is fashioned of sheet metal approximately one eighth inch in thickness to provide a substantially rigid means which is not easily distorted or bent under impact.

As shown in FIGURES 1, 2, 3 and 6, the offset portions 32 of the plates preferably extend upwardly and in overlapping relation with the lower end regions of the base portions 30 of adjacent plates. The base or attachment portion 30 of each member is adapted to be secured to the flexible body 20 of the guard construction. As shown in FIGURES 4 through 6, the portion 30 is formed with openings 36 from which the metal has been partially severed and the material struck-up to provide projections 40.

As particularly shown in FIGURE 4, the metal severed and struck-up from each member is of tapered or pointed configuration so as to enhance the piercing of the projections 40 through the flexible guard 20. After the struck-up portions 40 are projected through openings in the flexible sheet or guard 20, a backing plate 42, having openings 44 to accommodate the projections 40, is assembled in continuous relation with the opposite surface of the flexible sheet 20, as shown in FIGURE 6. The projections 40 are then bent over or distorted to the positions shown at 46 in FIGURE 6 to securely fasten each of the plates 28 to the flexible guard 20 with the plates of a row in aligned overlapping relation.

As shown in FIGURES 1, 2, 3 and 6, the planar offset portion 32 overlaps a substantial area of the attachment portion 30 of the adjacent plate 28, the overlapped region of the portion 30 snugly fitting between the overlapping offset portion 32 and the sheet 20.

By reason of the overlap of the planar portions 30 and 32 of adjacent plates, the flexible flap or sheet 20 is prevented from appreciable flexure rearwardly of the vehicle as the overlapping portions in conjunction with the method of attachment of the plates or members 28 to the guard 20 cooperate to resist rearward flexure of the splash guard.

The arrangement, however, provides for flexure of the body or sheet 20 in the opposite direction viz. toward the adjacent vehicle wheel as the zones 50 of the guard or flexible sheet 20 may be flexed or distorted in the opposite direction as the flexing is not resisted by the overlapping portions 30 and 32 of the members or plates 28. This feature is of advantage when the vehicle is backed into an impediment such as a loading dock 56 illustrated in FIGURE 2 whereby the flexible sheet 20 may be readily flexed at one or more of the zones 50 and prevents breakage or tearing of the flexible guard or sheet 20. As the metal members 28 are of substantial thickness and rigidity, they are not easily damaged by being pinched between the vehicle wheel and loading dock in a manner illustrated in FIGURE 2.

The offset portion 32 of the members 28 is provided with openings 58 to facilitate attachment of the splash guard construction to the bracket means 22 carried by the vehicle body or frame.

As shown in FIGURES 1 and 2, the portion 32 of the uppermost of the plates 28 is disposed with the openings in alignment with openings in a depending portion 23 of the bracket 22 and receives securing bolts 25, the bolts passing through the openings 58 in the uppermost plate 28 and through openings in the flexible sheet or flap 20.

The bolts 25 when drawn up serve to rigidly secure the uppermost plate 28 to the bracket 22 and, through the overlapping relation of the several plates in each of the rows of plates, flexure of the guard 20 in a direction rearwardly of the vehicle is effectively prevented. While in the illustrated embodiment, the offset portions 32 of the plates 28 extend upwardly, it is to be understood that all of the plates in a row may be disposed with the overlapping portions 32 extending downwardly as rearward flexure of the flexible guard or sheet 20 will be effectively resisted with the plates extending in either direction.

The reinforcing means of the invention is adaptable for use with splash guards of the flat flap type which have been conventionally employed in connection with wheels of trucks and the like. The plates 28 may be disposed or assembled in one or more rows on a flap or guard 20 and the plates secured to the flap as shown in FIGURE 6. Through this arrangement, the flexible guard which otherwise would be capable of being flexed rearwardly or sailing rearwardly relative to the vehicle is conditioned by the overlapping plates so that it will not be flexed in a rearward direction during forward movement of the vehicle.

The splash guard body 20 and the plates 28 assembled in one or more rows thereon may be supplied to a user as a complete assembly. To install the assembly the operator of the vehicle need only apply the bolts 25 through the openings in the uppermost of the plates 28 and openings in the bracket 22 mounted on the vehicle.

It will also be apparent that a flexible flap may be equipped by the vehicle operator with the overlapping plates of the invention to provide against rearward flexure of the guard, and for such purpose the plates 28 and backing plates 42 may be supplied to the operator for assembly with flat flaps installed on a vehicle.

For comparatively narrow splash guards, such as those for use adjacent a single vehicle wheel, a single row of plates 28 may be adequate for the purpose. Where splash guards of substantial width are required for use with large dual wheels of trucks or other vehicles, it is desirable to utilize two or more rows of plates 28 to adequately resist rearward flexure of the flexible guard throughout its entire area.

The adaptability of the reinforcing plate and flexible flap construction permitting forward flexure or distortion of the flexible flap or guard has other advantages. For example, in certain operations of dump trucks, cement mixers, and other off-the-highway truck activities, it is desirable to flex or roll the flexible flap or guard forwardly above the rear wheel.

The arrangement of the invention is capable of being flexed to such position and may be held in a forwardly rolled or flexed condition by a chain or other flexible means looped beneath the rolled or flexed unit and secured to the vehicle to temporarily retain the splash guard unit in juxtaposition with the body and forwardly of its zone of attachment with the vehicle frame.

It is apparent that, within the scope of the invention, modifications and different arrangements may be made other than as herein disclosed, and the present disclosure is illustrative merely, the invention comprehending all variations thereof.

I claim:

1. A splash guard for vehicles including a sheet of flexible nonmetallic material, a plurality of metal members arranged longitudinally on one surface of the sheet, each of said members of lesser width than the sheet of material and having a planar base portion and an offset portion, means securing the base portions of said members to the sheet with the members in longitudinally aligned relation, the offset portion of each member being disposed contiguous with the planar base portion of the adjacent member to restrain flexing movement of the sheet in one direction normal to the plane of the sheet but providing for flexing movement of the sheet in the opposite direction.

2. A splash guard for vehicles including a sheet of flexible rubber-like material, a plurality of metal members arranged in spaced rows on one major surface of the sheet, each of said members of lesser width than the sheet of material and having a planar base portion and an offset portion, projections formed on the base portions extending through openings in the sheet, a backing plate for each of the members cooperating with the projections to secure the members to the sheet, the offset portion of each member being disposed contiguous with the base portion of the adjacent member to restrain flexing movement of the sheet in one direction normal to the plane of the sheet but providing for flexing movement in the opposite direction.

3. A splash guard for a vehicle comprising a sheet of nonmetallic flexible material adapted to be suspended from the vehicle, a plurality of metal plates, each of said plates being of lesser width than the sheet of material and formed with a planar attachment portion and a planar offset portion, said members being arranged in two spaced rows adjacent one surface of said flexible sheet with the offset portion of a plate overlapping the planar attachment portion of the adjacent plate, and means formed on the attachment portion securing the same to the flexible sheet.

4. A splash guard for a vehicle comprising a sheet of nonmetallic flexible material adapted to be suspended from the vehicle, a plurality of metal plates, each of said plates being formed with a planar attachment portion and a planar offset portion, said members being disposed in transversely spaced rows on one surface of said flexible sheet with the planar offset portion of a plate overlapping the planar attachment portion of the adjacent plate, and means associated with the attachment portion of each plate securing the same to the flexible sheet.

References Cited in the file of this patent

UNITED STATES PATENTS

| | | |
|---|---|---|
| 1,178,337 | Newton | Apr. 4, 1916 |
| 2,000,220 | Cohen | May 7, 1935 |
| 2,405,262 | Lindsay | Aug. 6, 1946 |
| 2,782,053 | Long | Feb. 19, 1957 |

FOREIGN PATENTS

| | | |
|---|---|---|
| 203,213 | Germany | Oct. 20, 1908 |
| 718,230 | France | Nov. 4, 1931 |